United States Patent
Görzen

(10) Patent No.: US 8,960,225 B2
(45) Date of Patent: Feb. 24, 2015

(54) METHOD FOR DETECTING A CLOSING TIME POINT OF A VALVE HAVING A COIL DRIVE, AND VALVE

(75) Inventor: Johann Görzen, Aindling (DE)

(73) Assignee: Continental Automotive GmbH, Hanover (DE)

( * ) Notice: Subject to any disclaimer, the term of this patent is extended or adjusted under 35 U.S.C. 154(b) by 0 days.

(21) Appl. No.: 14/116,903

(22) PCT Filed: May 9, 2012

(86) PCT No.: PCT/EP2012/058553
§ 371 (c)(1),
(2), (4) Date: Nov. 11, 2013

(87) PCT Pub. No.: WO2012/152835
PCT Pub. Date: Nov. 15, 2012

(65) Prior Publication Data
US 2014/0069533 A1    Mar. 13, 2014

(30) Foreign Application Priority Data

May 9, 2011    (DE) .......................... 10 2011 075 521

(51) Int. Cl.
*F02D 41/24*    (2006.01)
*F16K 37/00*    (2006.01)
(Continued)

(52) U.S. Cl.
CPC ........ *F16K 37/0041* (2013.01); *F02D 41/2467* (2013.01); *H01F 7/1844* (2013.01);
(Continued)

(58) Field of Classification Search
USPC .......................... 137/554; 251/129.04, 129.15; 324/207.24; 361/152, 187
See application file for complete search history.

(56) References Cited

U.S. PATENT DOCUMENTS 5,182,517 A * 1/1993 Thelen et al. ................. 361/152
5,880,920 A * 3/1999 Fischer et al. ................ 361/187
(Continued)

FOREIGN PATENT DOCUMENTS

DE    19753275 A1    6/1999    ............... F01L 9/04
DE    19836769 C1    4/2000    ............... F01L 9/04
(Continued)

OTHER PUBLICATIONS

International Search Report and Written Opinion, Application No. PCT/EP2012/058553, 16 pages, Dec. 21, 2012.

*Primary Examiner* — John Bastianelli
(74) *Attorney, Agent, or Firm* — King & Spalding L.L.P.

(57) ABSTRACT

A method for detecting a closing moment of a valve having a coil drive includes impressing an electrical voltage in the exciter coil to generate an exciter current through the coil, which attracts the movable armature and lifts the valve element off its valve seat. After the exciter current decays to zero, the voltage profile at the exciter coil is sampled and read out over time in the form of time value/voltage value pairs. The detected voltage values and time valves are transformed by the formation of a logarithm to form a transformed function. The transformed function is subsequently derived numerically with the formation of a derivation function. A transformed time value corresponding to the valve closing moment is detected based on the derivation function of a predetermined threshold value S being undershot, and the closing moment is calculated therefrom by inverse transformation.

13 Claims, 11 Drawing Sheets

(51) Int. Cl.
*H01F 7/18* (2006.01)
*F02D 41/26* (2006.01)
*F16K 31/06* (2006.01)
*F02D 41/20* (2006.01)

(52) U.S. Cl.
CPC .......... *F02D41/263* (2013.01); *F16K 31/0658* (2013.01); *F16K 31/0689* (2013.01); *F02D 41/20* (2013.01); *F02D 2041/2055* (2013.01); *F02D 2200/0618* (2013.01); *H01F 2007/185* (2013.01); *H01F 2007/1861* (2013.01)
USPC .................. 137/554; 251/129.04; 251/129.15; 324/207.24; 361/152; 361/187

(56) References Cited

U.S. PATENT DOCUMENTS

| | | | |
|---|---|---|---|
| 6,494,172 B2 * | 12/2002 | Komatsu et al. | 251/129.15 |
| 6,737,946 B2 * | 5/2004 | Seale et al. | 251/129.15 |
| 6,949,923 B2 * | 9/2005 | Schultz et al. | 324/207.24 |
| 2002/0130287 A1 * | 9/2002 | Smith et al. | 251/129.15 |
| 2012/0116702 A1 | 5/2012 | Beer et al. | 702/65 |
| 2012/0166069 A1 | 6/2012 | Kemmer et al. | 701/105 |

FOREIGN PATENT DOCUMENTS

| | | | | |
|---|---|---|---|---|
| DE | 10020896 A1 | 10/2001 | ................ | F01L 9/04 |
| DE | 10034830 A1 | 2/2002 | ................ | H01L 7/18 |
| DE | 10108425 C1 | 6/2002 | ........... | A61M 16/20 |
| DE | 102008006706 A1 | 8/2009 | ................ | H01F 7/18 |
| DE | 102008041528 A1 | 3/2010 | .............. | F02D 41/22 |
| DE | 102009027311 A1 | 1/2011 | ................ | H01F 7/18 |
| DE | 102009032521 A1 | 1/2011 | .............. | F02D 41/20 |
| EP | 2514956 A1 | 10/2012 | .............. | F02D 41/20 |
| WO | 2012/152835 A2 | 11/2012 | .......... | F02D 41/2467 |

* cited by examiner

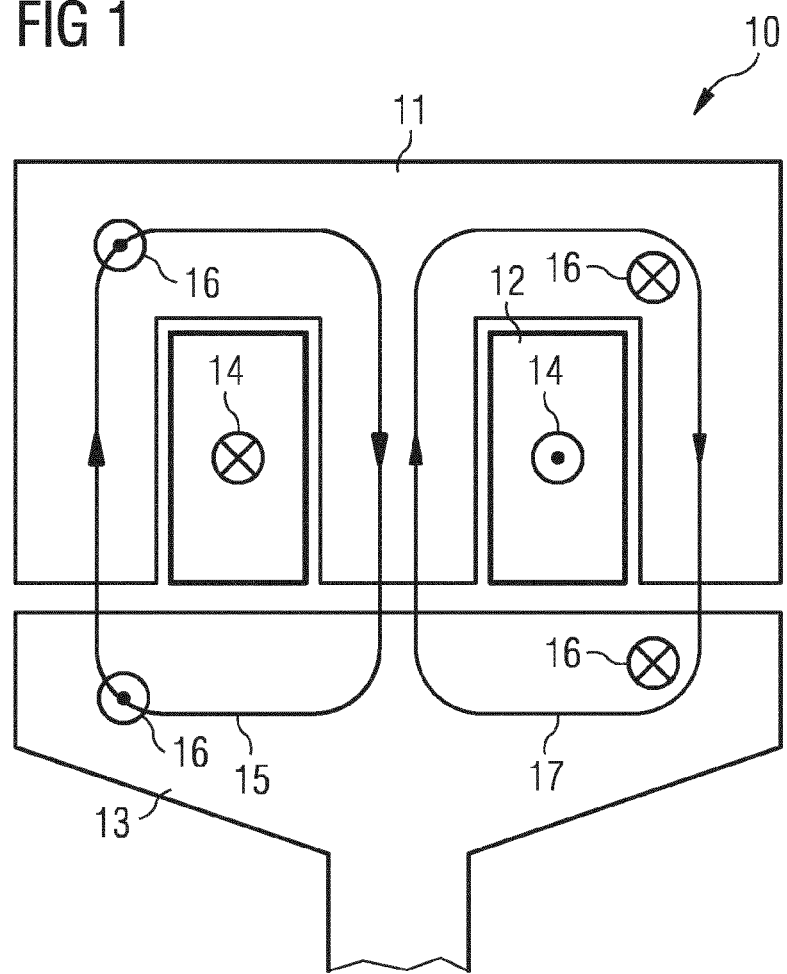

METHOD FOR DETECTING A CLOSING TIME POINT OF A VALVE HAVING A COIL DRIVE, AND VALVE

CROSS-REFERENCE TO RELATED APPLICATIONS

This application is a U.S. National Stage Application of International Application No. PCT/EP2012/058553 filed May 9, 2012, which designates the United States of America, and claims priority to DE Application No. 10 2011 075 521.7 filed May 9, 2011, the contents of which are hereby incorporated by reference in their entirety.

TECHNICAL FIELD

The invention relates to a method for detecting a closing time point of a valve which has a coil drive, and to a corresponding valve. A valve of this kind has a movable valve element and a valve seat which interact in order to open and close the valve. The coil drive comprises an immovable electromagnetic stator having a field coil and a movable armature which is spaced apart from the stator in an inoperative position and which is coupled to the movable valve element in such a way that it causes the valve to open in the event of an armature movement by lifting the valve element out of the valve seat.

BACKGROUND

Certain conventional methods for detecting a closing time of a valve include impressing an electrical voltage into the field coil for a limited time in order to generate a field current through said field coil, as a result of which the movable armature is attracted so as to form an armature movement and lifts the valve element out of its valve seat, allowing the field current to decay to zero, then sampling and reading out the voltage profile across the field coil with respect to time.

Methods of this kind are used, for example, for determining the closing time point of injection valves for internal combustion engines. Knowledge of the duration of the valve opening process and therefore of the closing time point of the valve is an important measurement variable for controlling the quantity of fuel injected per injection operation. The closing time point of a valve can depend, for example, on the temperature, the aging state of the valve, the pressure of the fluid or gas flowing through the valve, and the throughflow rate. As a result, inaccuracies can occur when metering fluid. In order to correct these influences using a superordinate control unit, it is necessary to monitor the closing time point during operation.

In known injection valves, for example for common-rail systems, the valve element in the form of a nozzle needle rests in a valve seat when the valve is closed and thereby prevents pressurized, liquid, gaseous or liquid/gaseous fuel from flowing into the combustion space of an internal combustion engine. In order to open the valve, the valve element is lifted out of the valve seat under the action of force of an actuator and of the applied fuel pressure, against a spring force of a valve spring. Therefore, fuel can flow through between the valve element and the valve seat. In this case, the actuator is, for example, a coil drive with a movable armature which exerts the necessary force onto the valve element by virtue of an armature movement.

In order to close the valve, the valve element is pushed back into its valve seat under the action of force of the applied fuel pressure and of the valve spring, and the valve is therefore closed. It is generally not necessary for the actuator to apply force to the valve element for this purpose. Therefore, it is generally sufficient to terminate the process of impressing a voltage into the field coil in order to close the valve, with the result that, after a decay time, the field current in the coil returns to zero and accordingly the magnetic attraction to the movable armature declines. Consequently, said movable armature can fall back into its inoperative position. The reduction in current can also be accelerated by a back-e.m.f.

In systems in which the armature is fixedly coupled to the valve element, said armature, when it falls back, crashes back into its inoperative position at the same time as the valve element. In other variants, in which the armature is not fixedly coupled to the valve element, the armature can swing out freely in its inoperative position, while the valve element crashes into its seat.

Once the field current in the coil has fallen to zero, a characteristic terminal voltage, the so-called decay voltage, can be measured across the coil. This terminal voltage is based on self-induction in the coil on account of the change in magnetic field due to the falling field current and due to eddy currents which are induced in the moving armature. In ideal systems, a characteristic bend should be observed in the profile of the decay voltage at the time point which corresponds to the armature falling back into its inoperative position. This time point in turn corresponds to the closing time point of the valve, wherein the time point may be subject to a system-dependent constant offset.

Known methods for identifying the closing time point therefore use a comparison of the measured decay voltage with a reference voltage profile or derivatives of said reference voltage profile with respect to time. The closing time point can then be determined from the deviation between the two voltage profiles.

In real systems however, the profile of the decay voltage is often subject to a large amount of noise which is further amplified by derivation. In systems with an armature which swings out freely, the characteristic bend is furthermore only very slightly pronounced and it is virtually no longer possible to detect said characteristic bend using the known methods. Therefore, reliable detection of the closing time point is generally not possible in systems of this kind using the known methods.

SUMMARY

One embodiment of the invention provides a method for detecting a closing time point of a valve having a coil drive and having a movable valve element which interacts with a valve seat in order to open and close the valve, wherein the coil drive comprises an electromagnetic stator with a field coil and a movable armature which is spaced apart from the stator in an inoperative position and is coupled to the movable valve element in such a way that it causes the valve to open in the event of an armature movement by lifting the valve element out of the valve seat. The method comprises: impressing an electrical voltage into the field coil for a limited time in order to generate a field current through said field coil, as a result of which the movable armature is attracted so as to form an armature movement and lifts the valve element out of its valve seat; allowing the field current to decay to zero; then sampling and reading out the voltage profile (U(t)) across the field coil with respect to time in the form of value pairs (t(k); U(k)) which each comprise a time value (t(k)) and a voltage value (U(k)); transforming the identified voltage values and time values by forming a logarithm $x(k):=\log_b t(k)$ and $y(k):=c \cdot \log_b(U(k))$ with a base b and with a constant c in order to form a transformed function y(x) comprising value pairs (x(k); y(k)); then numerically deriving the transformed function so as to form a derivative function $$\delta(x) := \frac{\Delta y(x)}{\Delta x};$$

detecting a transformed time value $x_{close}$, which corresponds to the closing time point $t_{close}$ of the valve, on the basis of the derivative function of a predetermined threshold value S(x) being undershot $\delta(x_{close}) \le S(x)$; and calculating the closing time point $t_{close}$ by back-transformation $t_{close} = b^{*close}$.

In a further embodiment, the value pairs (t(k); U(k)) which each comprise a voltage value (U(k)) and a time value (t(k)) are determined using an oversampling method.

In a further embodiment, the value pairs (x(k); y(k)) of the transformed function y(x) are averaged/determined using an oversampling method.

In a further embodiment, the movable armature can swing out freely when it falls back into its inoperative position.

In a further embodiment, the movable armature is fixedly coupled to the valve element and strikes firmly when it falls back into its inoperative position, while the valve element falls into its valve seat.

In a further embodiment, the movable armature and/or the stator have/has short-circuiting rings in order to assist in the formation of eddy currents.

Another embodiment provides a valve having a movable valve element which interacts with a valve seat in order to open and close the valve, and also having a coil drive which comprises an electromagnetic stator with a field coil and a movable armature which is spaced apart from the stator in an inoperative position and is coupled to the movable valve element in such a way that it causes the valve to open in the event of an armature movement by lifting the valve element out of the valve seat. The valve also includes: a control unit for impressing an electrical voltage into the field coil for a limited time in order to generate a field current through said field coil, wherein the field coil attracts the movable armature so as to form an armature movement, as a result of which the valve element is lifted out of its valve seat; means for sampling and reading out the voltage profile (U(t)) across the field coil with respect to time in the form of value pairs (t(k); U(k)) which each comprise a time value (t(k)) and a voltage value (U(k)) after the field current has decayed to zero; an evaluation unit for transforming the identified voltage values and time values by forming a logarithm $x(k) := \log_b t(k)$ and $y(k) := c \cdot \log_b U(k)$ with a base b and with a constant c in order to form a transformed function y(x) comprising value pairs (x(k); y(k)) and then numerically deriving the transformed function so as to form a derivative function $$\delta(x) := \frac{\Delta y(x)}{\Delta x};$$

and also in order to detect a transformed time value $x_{close}$, which corresponds to the closing time point $t_{close}$ of the valve, on the basis of the derivative function of a predetermined threshold value S(x) being undershot $\delta(x_{close}) \le S(x)$; and in order to calculate the closing time point $t_{close}$ by back-transformation $t_{close} = b^{*close}$.

In a further embodiment, the movable armature can swing out when it falls back into its inoperative position.

In a further embodiment, the movable armature is fixedly coupled to the valve element and firmly strikes when it falls back into its inoperative position, while the valve element falls into its valve seat.

In a further embodiment, the movable armature and/or the stator have/has short-circuiting rings in order to assist in the formation of eddy currents.

In a further embodiment, the valve is an injection valve for an internal combustion engine.

BRIEF DESCRIPTION OF THE DRAWINGS

Example embodiments of the invention are explained in greater detail below with reference to the drawings, in which:

FIG. 1 schematically shows a coil drive for a valve;

DETAILED DESCRIPTION

Figure 2A:
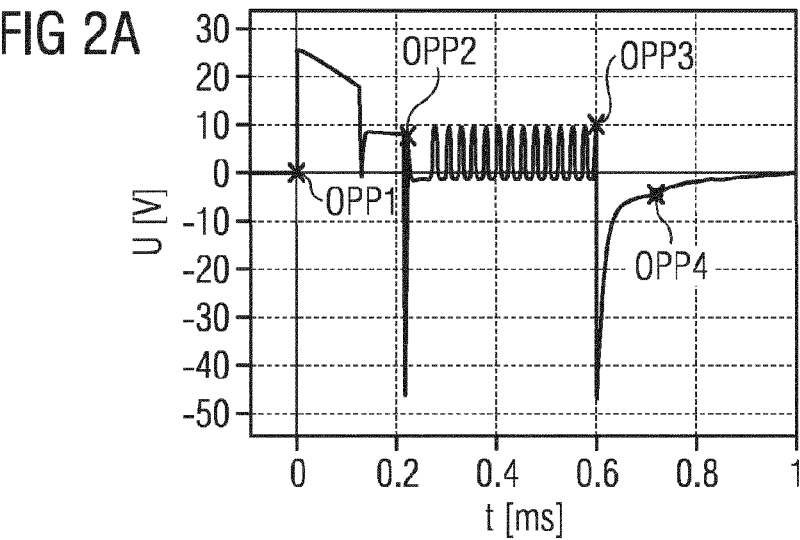
FIGS. 2A-2C schematically shows the characteristic profile of the voltage and current across the field coil and the armature movement during a valve opening cycle.

Embodiments of the present invention provide an improved method and also a valve, with which method the closing time point of the valve can be reliably detected (even when there is a large amount of noise and an armature which swings out freely).

The disclosed method is suitable for detecting a closing time point of a valve which has a coil drive. The valve has a movable valve element and a valve seat which interact in order to open and close the valve. The coil drive comprises an immovable electromagnetic stator having a field coil and a movable armature which is spaced apart from the stator in an inoperative position. The armature is coupled to the movable valve element in such a way that it causes the valve to open in the event of an armature movement by lifting the valve element out of the valve seat. As an alternative, the coil could also be located in the moving part of the coil drive. In this case, the armature (without coil) in the drive would be of immovable design and the stator with the coil would be designed as a movable part of which the movement is coupled to the valve element. However, this is not common.

According to the disclosed method, an electrical voltage is impressed into the field coil for a limited time, as a result of which a field current is generated through said field coil. Under the action of the resulting magnetic field, the movable armature is attracted by the stator. The movement of the armature out of its inoperative position in the direction of the stator is called the armature movement. On account of the armature being coupled to the valve element, the armature carries along the valve element during this movement, or the armature transmits an action of force onto the valve element, so that the valve element is lifted out of its valve seat. Once a voltage has been impressed into the field coil for a limited time, the field current in the coil decays again. This reduction in current can be additionally accelerated by impressing a back-e.m.f into the coil. Once the field current in the coil has decayed to zero again, the voltage profile (U(t)) across the field coil with respect to time is sampled and read out in the form of value pairs (t(k); U(k)) which each comprise a time value (t(k)) and a voltage value (U(k)). (Each k ∈ N represents a discrete measurement point in this case.)

The detected voltage values and time values are then transformed with the aid of a computer unit by forming a logarithm x(k):=log$_b$t(k) and y(k):=c·log$_b$U(k) with a base b and with a constant c. A transformed function y(x) comprising value pairs (x(k); y(k)) is generated from the above. This transformed function is then numerically differentiated so as to form a derivative function $$\delta(x) := \frac{\Delta y(x)}{\Delta x} = \frac{y(k) - y(k-1)}{x(k) - x(k-1)}.$$

The derivative function obtained in this way is finally used to detect a transformed time value $x_{close}$, which corresponds to the closing time point $t_{close}$ of the valve, wherein the derivative function falls below $\delta(x_{close}) \leq S(x)$ a predetermined threshold value S(x) or assumes said threshold value at point $x_{close}$. Finally, the closing time point $t_{close}$ is calculated from this transformed time value, which is obtained in this way, by back-transformation $t_{close} = b^{*close}$. $x_{close}$ can also lie between two discretely sampled values x(k$_1$) and x(k$_1$+1).

The disclosed method for detecting the closing time point has the advantage over the known methods that it is suitable both for systems with an armature which strikes hard and also for systems with an armature which swings out freely, but in particular for systems with a weakly pronounced bend.

By transforming the measured voltage profile into a log-log scale and subsequent differentiation, the closing time point can also be detected without a detectable bend in the profile of the decay voltage.

The threshold value is preferably predefined by reference measurements. In systems with a firmly seated armature, the characteristic bend in the profile of the decay voltage can be detected by a different gradient before and after the bend. In this case, the threshold value ideally lies in the middle between the two gradients. The threshold value can be variably defined as the function S(x). However, the threshold value S is preferably constant.

By virtue of defining the threshold value, a substantial portion of the systematic deviation (offset) when determining the actual closing time point is also determined. However, since a resulting deviation is generally a system-dependent constant, the influence of said deviation can be compensated for by actuation of the valve.

The base of the logarithmic transformation can be, for example, the number 10 or else a different number. Before the logarithmic transformation, the measured voltage and time values are preferably divided by the time and, respectively, voltage units in order to obtain dimension-free values. This is reversed again during the back-transformation of the determined closing time point. The transformed function y(x) can be multiplied by any desired constant c. The function can, for example, be standardized in this way.

According to one variant of the method, the value pairs (t(k); U(k)) which each comprise a voltage value and a time value are determined using an oversampling method. That is to say that an average of a specific number of values is taken in each sampling process. The oversampling method is generally known in the field of signal processing and therefore does not need to be described in detail here. By applying oversampling when sampling the voltage profile (t(k); U(k)), the influence of the noise can be reduced even more.

According to another variant of the method, it is also possible, as an alternative, to determine the value pairs (x(k); y(k)) of the transformed function y(x) using an oversampling method. A relatively low number of transformed value pairs (x(k); y(k)) are formed from a relatively large number of voltage/time value pairs (t(k); U(k)) using an averaging method. The influence of the noise can also be advantageously reduced in this way.

It may be possible to dispense with an oversampling method in low-noise systems. As an alternative to the oversampling, a low-pass filter can also be used in the disclosed method in order to reduce the influence of the noise. However, this also generally reduces the characteristic bend signal.

The method may be particularly suitable for systems with an armature which swings out freely. According to a preferred variant of the method, the coil drive of the valve therefore has a movable armature which can swing out when it falls back into its inoperative position.

According to another variant of the method, the movable armature of the valve is, in contrast, fixedly coupled to the valve element and strikes firmly when it falls back into its inoperative position, while the valve element falls into its valve seat.

As described above, the characteristic profile of the decay voltage is based on the self-induction in the coil and the induction on account of eddy currents which occur in the moving armature and the fixed stator. In a further variant, the movable armature and/or the fixed stator have/has short-circuiting rings which assist in the formation of eddy currents. Short-circuiting rings of this kind can be formed by inherently closed paths of a conductive material, such as copper or alloys with a high conductivity in comparison to the material of the armature or stator for example, in the armature or stator.

Other embodiments provide a valve having a coil drive and a control or computer unit which has all the components for executing the disclosed method. In particular, the valve may include the components described above in conjunction with the disclosed method.

The valve may be, for example, an injection valve for an internal combustion engine, for example in a common-rail system.

In order to sample and evaluate the voltage profile across the field coil, the valve preferably has a control unit and an evaluation unit. In a preferred development, the control unit and the evaluation unit are combined to form one unit. The valve has, in particular, means for impressing a voltage into the field coil for a limited time, and preferably also means for impressing a back-e.m.f into said field coil. The decay of the field current in the coil can be accelerated as a result. Control devices which are advantageously present can be used both for impressing the voltage into the field coil and also for sampling and reading out the decay voltage and evaluating the decay voltage.

By way of example, injection valves for internal combustion engines for controlling the injected quantity of fuel and the injection period are actuated by control units. Said control units can advantageously also be used for carrying out the method according to the invention. The method according to the invention therefore provides the additional advantage that it does not require any additional expensive components.

FIG. 1 schematically shows a coil drive 10 for a valve having a stationary stator 11 with a field coil 12 and a movable armature 13. The armature 13 is spaced apart from the stator in its inoperative position. When a voltage is impressed into the field coil, a flow 14 of field current is generated in said field coil. A principal magnetic field 15 builds up as a result. This attracts the movable armature 13 in the direction of the stator 11. In accordance with Lenz's Law, an eddy current 16 and a magnetic field 17 which is generated by said eddy current oppose the build-up of the principal magnetic field until the eddy current 16 has decayed.

A higher field current 14 than required is usually selected and therefore the armature 13 is attracted in a largely reproducible manner.

Figure 2B:
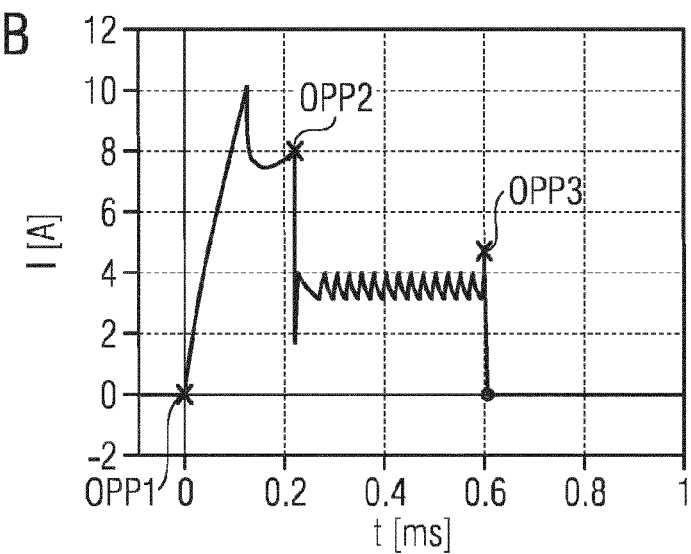
Figure 2C:
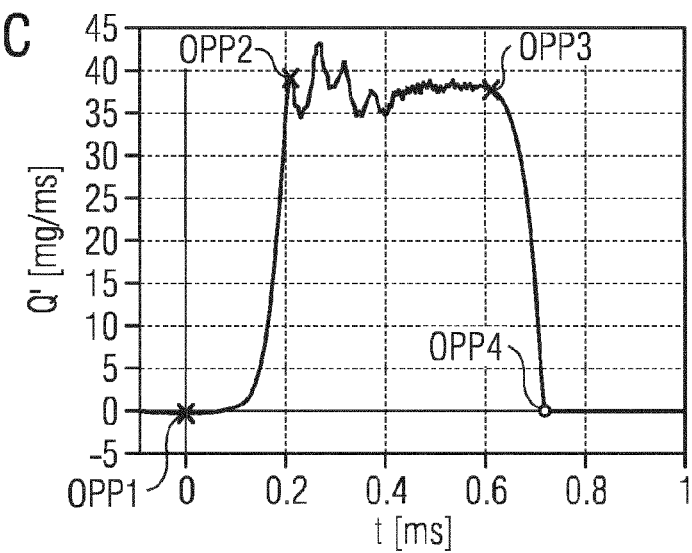

FIG. 2 shows the most important states of the solenoid 10 during a valve opening cycle. The terminal voltage across the field coil is illustrated in FIG. 2A). At the point OPP1 (at time point t=0), a valve opening process is started by a voltage U being impressed into the field coil. This voltage generates a flow I of current in the field coil, illustrated in FIG. 2B). The armature is attracted under the action of the magnetic field which is building up, FIG. 2C), and lifts the valve element out of its seat. At the point OPP2, the valve is completely open and the armature is attracted. After the desired duration, the valve begins to close at the point OPP3. A back-e.m.f is impressed into the field coil 12. The field current I then falls to zero and the principal magnetic field dissipates. Owing to the dissipating principal magnetic field, the armature falls back into its inoperative position. On account of the self-induction in the field coil and on account of the eddy currents in the moving armature, a terminal voltage can be measured across the field coil during this time. Said terminal voltage is called the decay voltage or free-wheeling voltage in this application. The armature reaches its inoperative position at point OPP4. A characteristic change in the voltage profile can be observed at this point. Only the time period between OPP3 and OPP4 will be looked at in the text which follows.

Figure 3A:
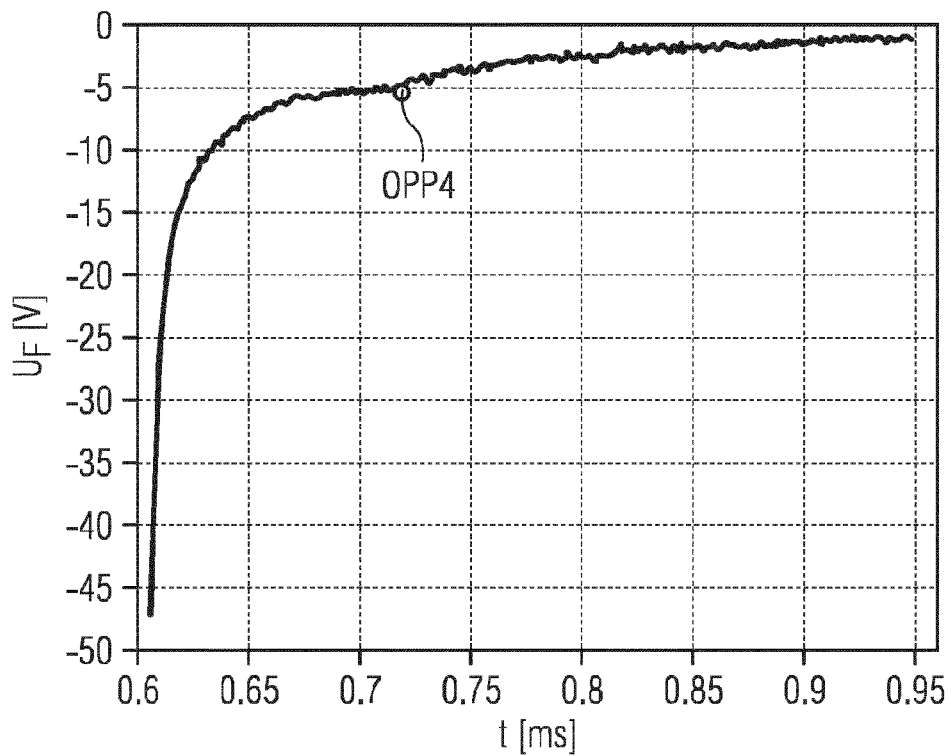
FIGS. 3A-3B schematically shows the profile of the decay voltage and the standardized profile of the decay voltage.
Figure 3B:
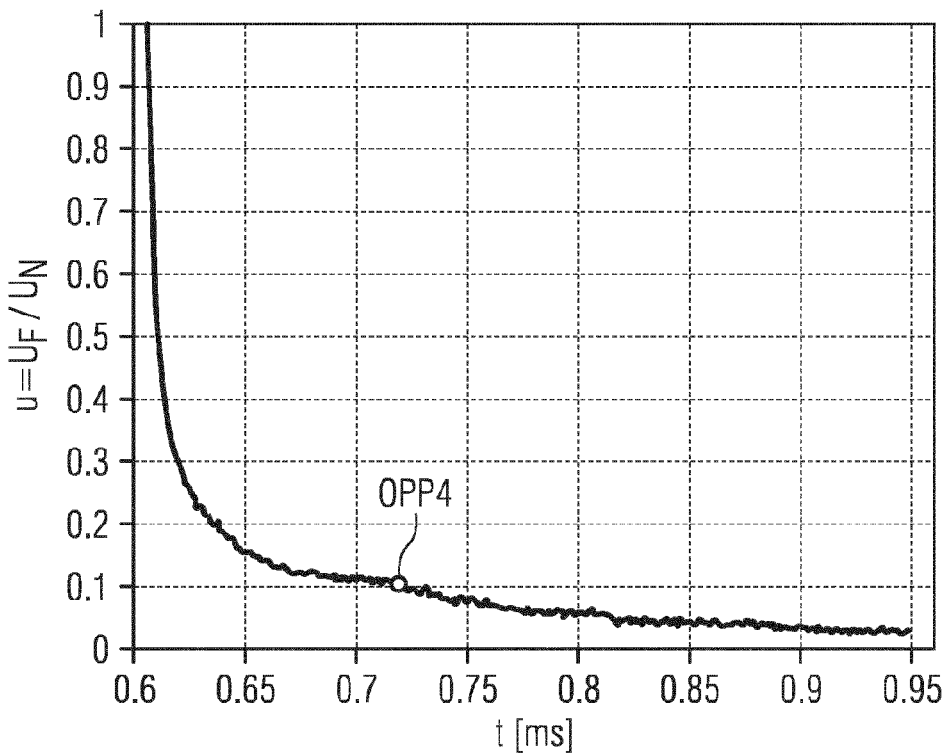

FIG. 3A) shows an enlarged detail of the profile of the decay voltage between the operating points OPP3 and OPP4. The voltage values are negative here. However, the absolute voltage values are not of interest in this case. Only the standardized profile is critical for evaluating the voltage profile. FIG. 3B) shows the voltage profile from FIG. 3A) in a standardized illustration. The closing time point of the valve at the operating point OPP4 is shown using a small bend in the voltage profile in both illustrations.

Figure 4A:
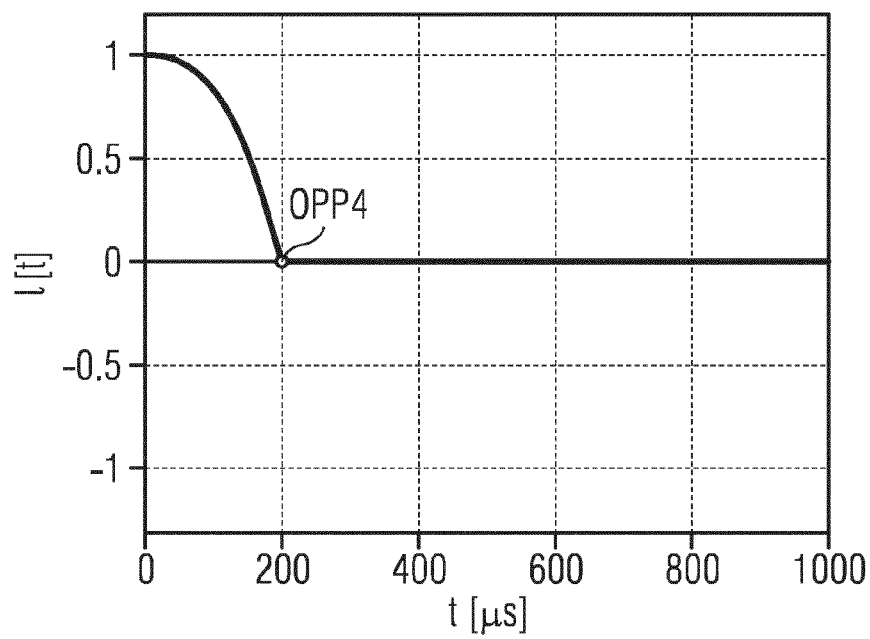
FIGS. 4A-4H schematically shows an ideal illustration of the armature movement l(t), of the profile of the decay voltage U(t), of the transformed function y(x) and of the derived function $\delta(x)$ for a system with an armature which lands hard and for an armature which swings out freely in comparison.
Figure 4B:
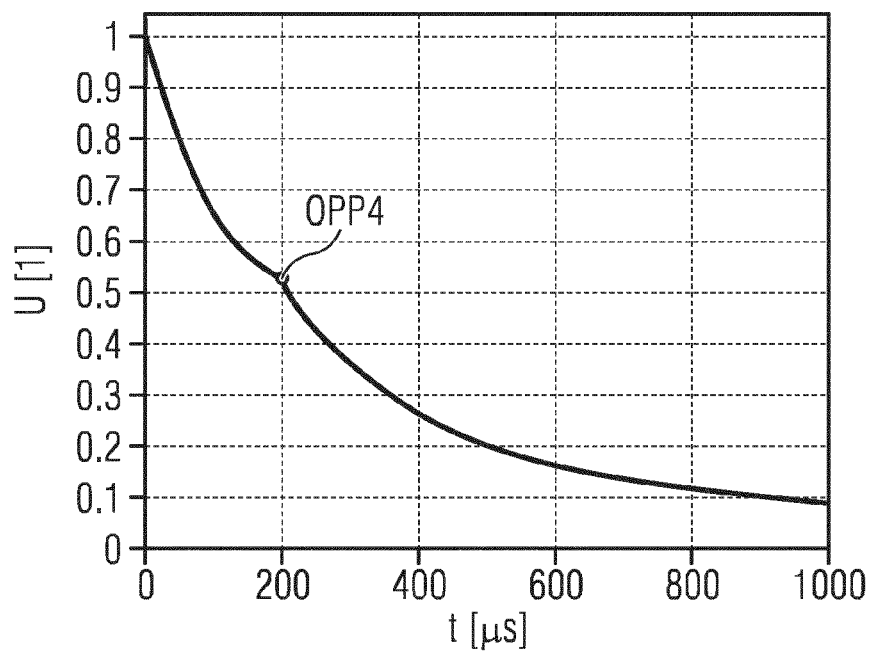
Figure 4C:
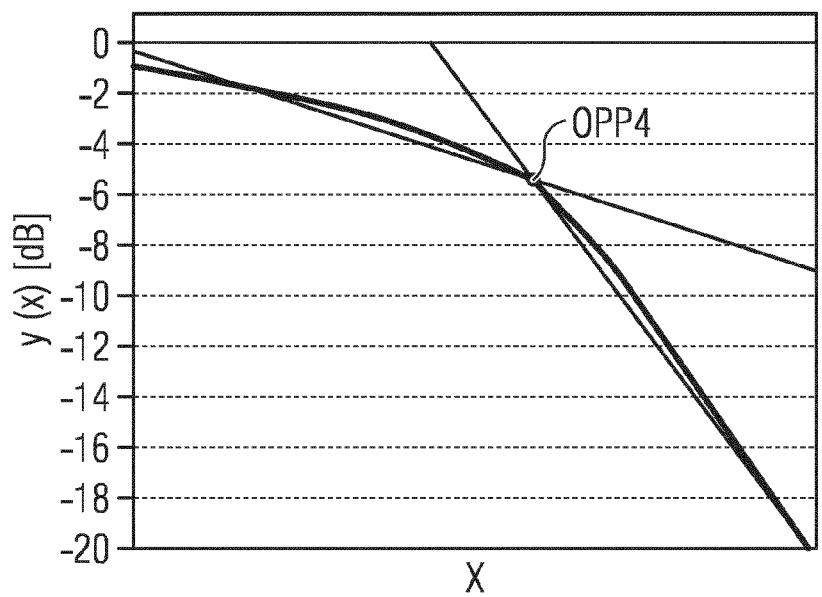
Figure 4D:
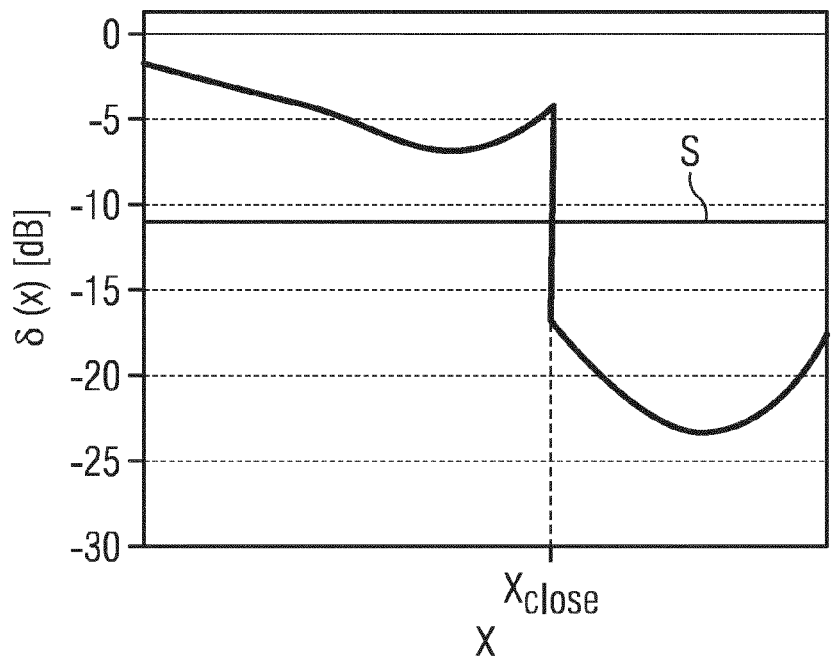
Figure 4E:
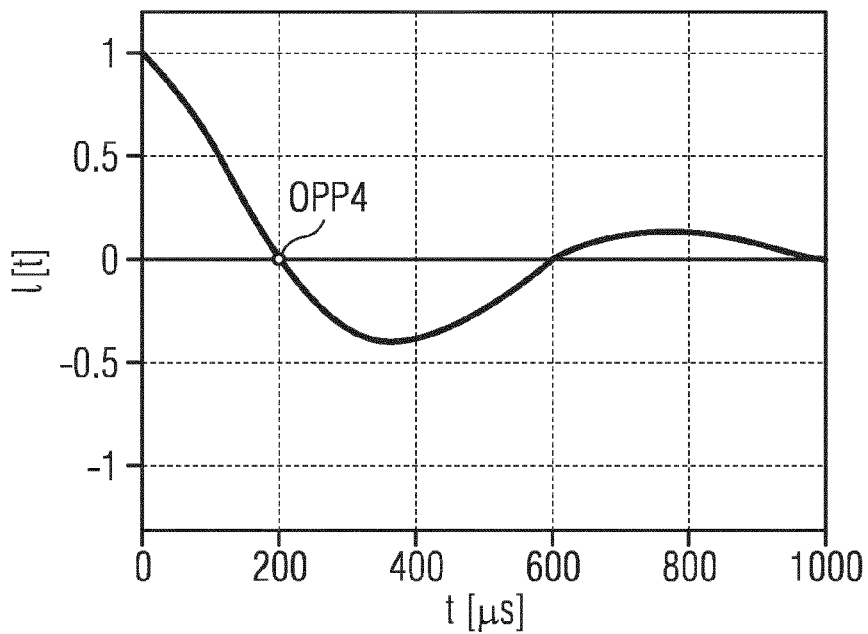
Figure 4F:
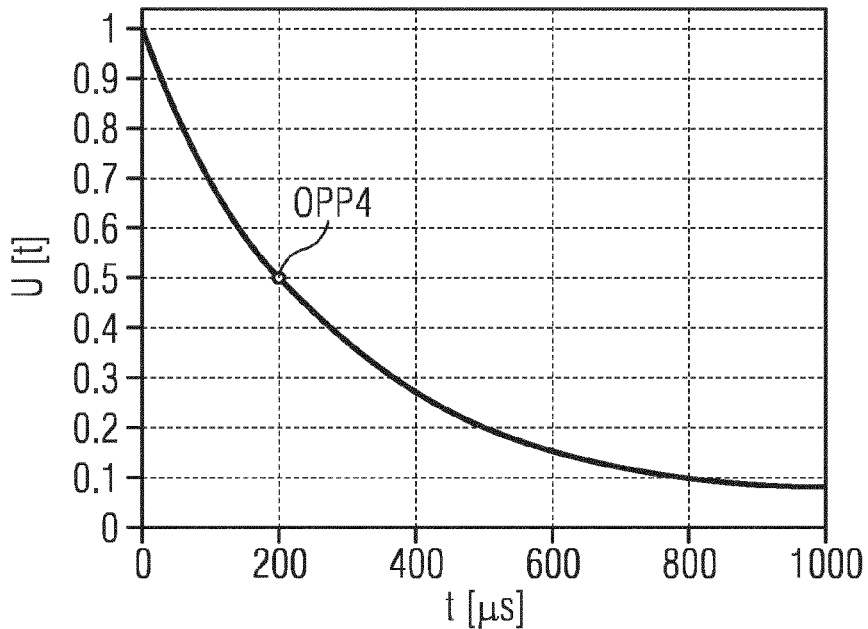
Figure 4G:
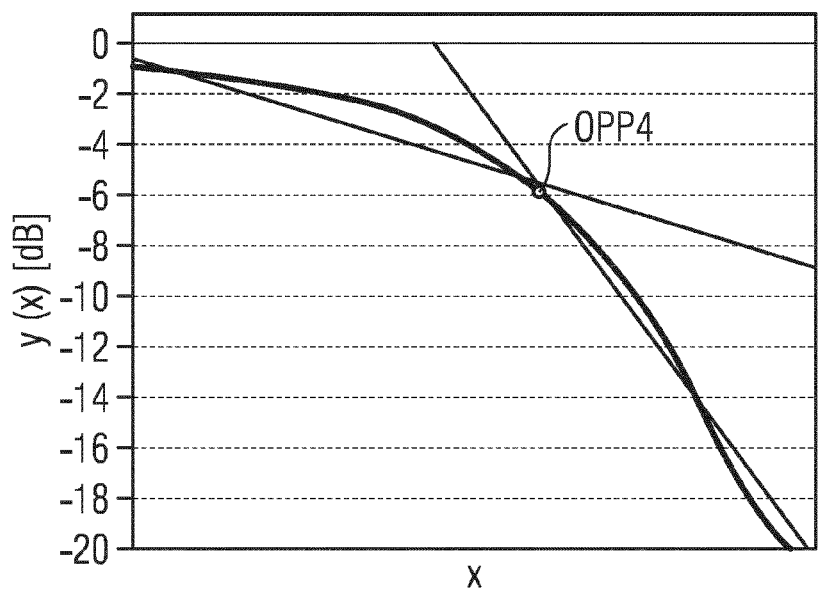
Figure 4H:
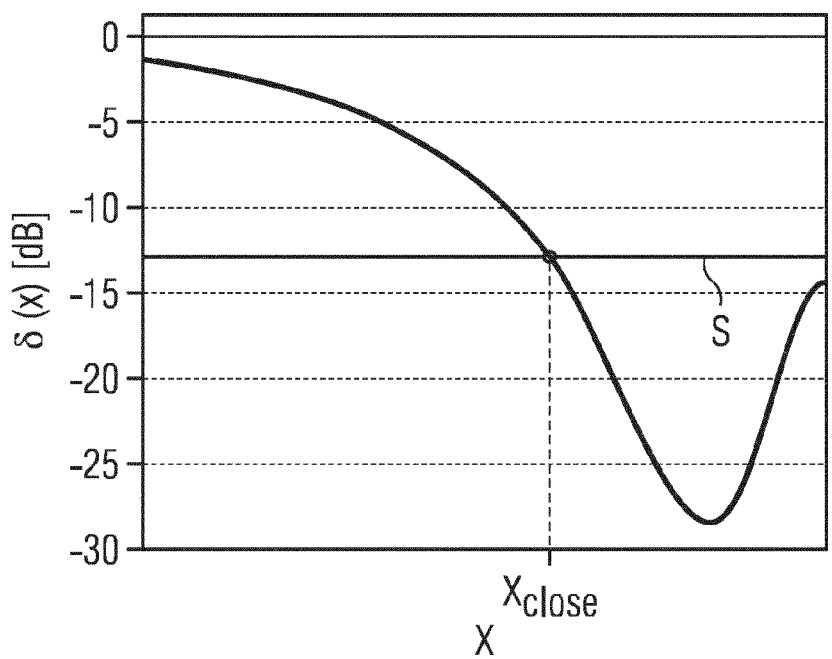

The armature movement l(t) is illustrated in standardized form for an armature which lands firmly in FIG. 4A), and for an armature which swings out freely in FIG. 4E). In FIGS. 4 and 5, subfigures A) to D) each relate to a system with an armature which lands firmly, and FIGS. E) to H) each relate to a system with an armature which swings out freely.

The decay voltage U which can be measured across the field coil at the same time is illustrated in standardized form in FIGS. 4B) and 4F). In the system with an armature which lands firmly, the closing time point can be clearly detected at the bend in the voltage profile at the operating point OPP4. In the system with an armature which swings out freely however (FIG. 4F), the closing time point at the operating point OPP4 no longer visibly stands out from the rest of the profile of the decay voltage.

The transformed functions y(k) of the decay voltage are each plotted in FIGS. 4C) and 4G). The values (x(k); y(k)) are obtained from the measured voltage/time value pairs (t(k); U(k)) by logarithmization. During the transformation of the voltage values U(k), the logarithm to base b=10 was formed and multiplied by the constant factor c=20. Accordingly, the transformed voltage values y(k) are illustrated in the unit decibels [dB] in this case. In the system with an armature which lands firmly (FIG. 4C), point OPP4 can be clearly identified at a change in the gradient. The transformed profile of the decay voltage can in each case be closely approximated by straight lines with different gradients before and after the closing time point. In the system with an armature which swings out freely (FIG. 4G), the transformed curve can likewise be approximated by straight lines before and after the closing time point at point OPP4. However, said straight lines can only reflect an averaged gradient and are considerably more difficult to detect.

FIGS. 4D) and 4H) each show the derived function $\delta(x)$ of the transformed function y(x). A sudden drop in the gradient, that is to say in the value of the derivative function, can be detected in the system with an armature which lands firmly (FIG. 4D). At this point $x_{close}$, the derivative function falls below the predetermined threshold value S and this point $x_{close}$ therefore corresponds to the sought closing time point of the valve. Finally, the closing time point is formed from the transformed closing time point $x_{close}$ by back-transformation.

The threshold value S (x) was preferably determined beforehand on the basis of reference measurements such that it lies approximately in the middle between the average gradient before the point $x_{close}$ and the average gradient after the point $x_{close}$. In principle, the threshold value S could also be determined by an automatic method and be adjusted as a variable function S (x). However, the threshold S (x) is preferably a constant threshold S, as illustrated here.

In the system with an armature which swings out freely (FIG. 4H), the transformed time point $x_{close}$ which corresponds to the closing time point can likewise be detected by the predetermined threshold value S being undershot. To this end, the threshold value S is preferably likewise predefined on the basis of reference measurements. In this system, the determined transformed time point $X_{close}$ reacts significantly more strongly to the threshold value being defined since no sudden drop in the gradient is observed. Therefore, the systematic deviation (offset) in the determination of the closing time point is also defined by the threshold value being defined.

FIG. 5 shows the corresponding curves from FIG. 4 for a real system with signals which are subject to noise for a system with a firmly seated armature (FIGS. 5A-D) and a system with an armature which swings out freely (FIGS. 5E-H). The individual curves and designations correspond to those illustrated in FIG. 4. The explanation will not be repeated here.

Figure 5A:
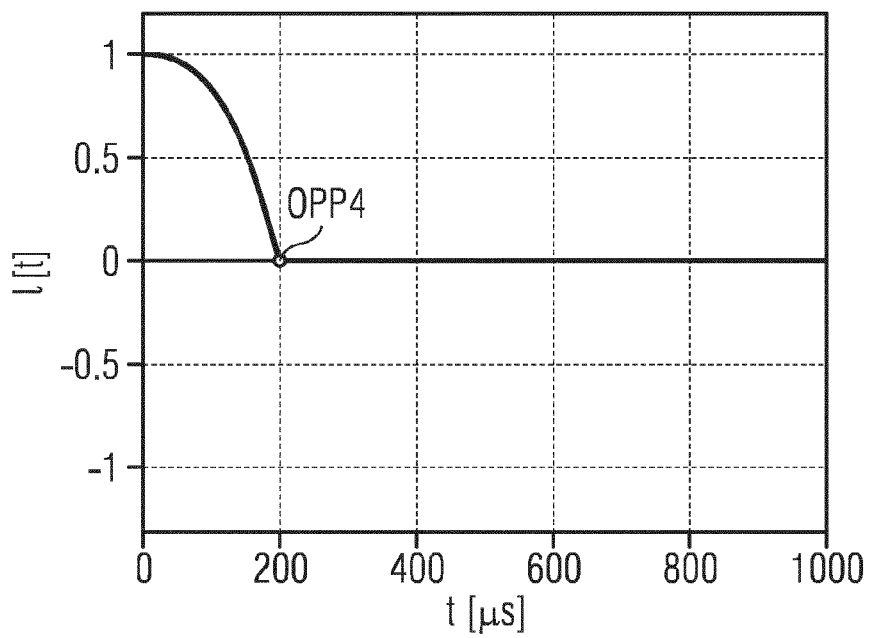
FIGS. 5A-5H schematically shows an illustration like that in FIG. 4 for a real system with signal noise and a derivative function $\delta(x)$ which is obtained by means of oversampling.
Figure 5B:
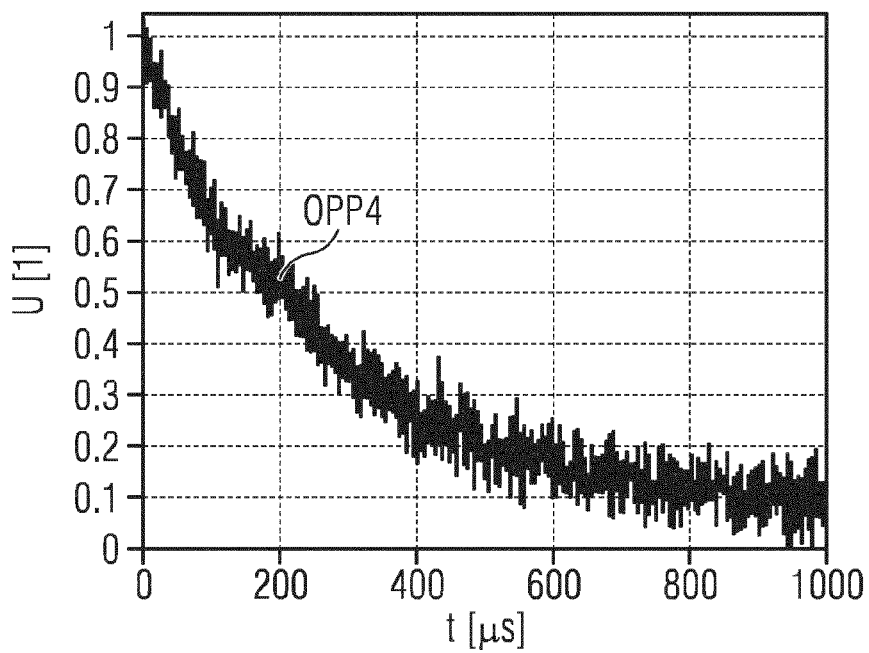
Figure 5C:
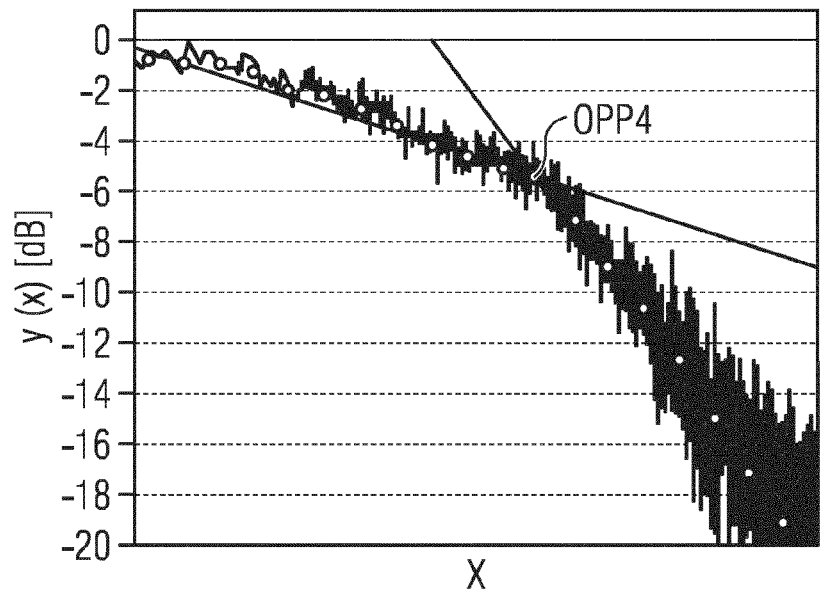

In contrast to FIG. 4, the signal of the decay voltage U is clearly subject to noise here. Therefore, the operating point OPP4 can still be identified only very indistinctly even in the system with a firmly seated armature (FIG. 5B). Even the different gradients before and after the point OPP4 in the transformed function y(x) can still be identified only indistinctly in this case.

Figure 5D:
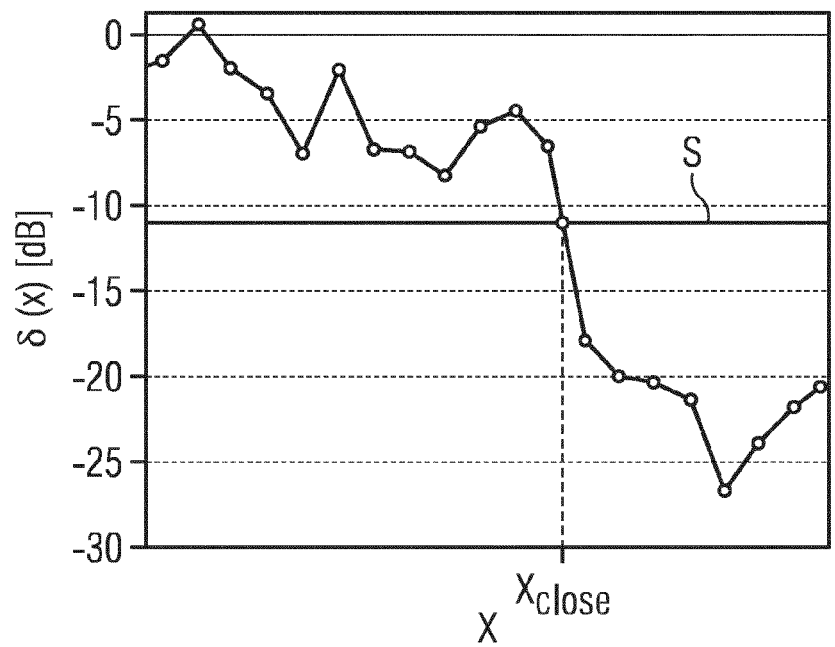
Figure 5E:
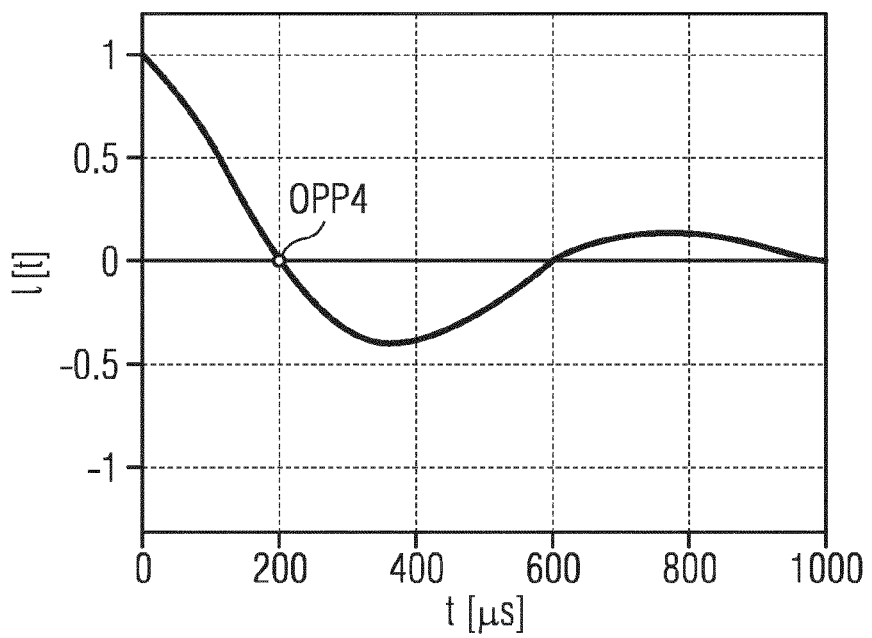
Figure 5F:
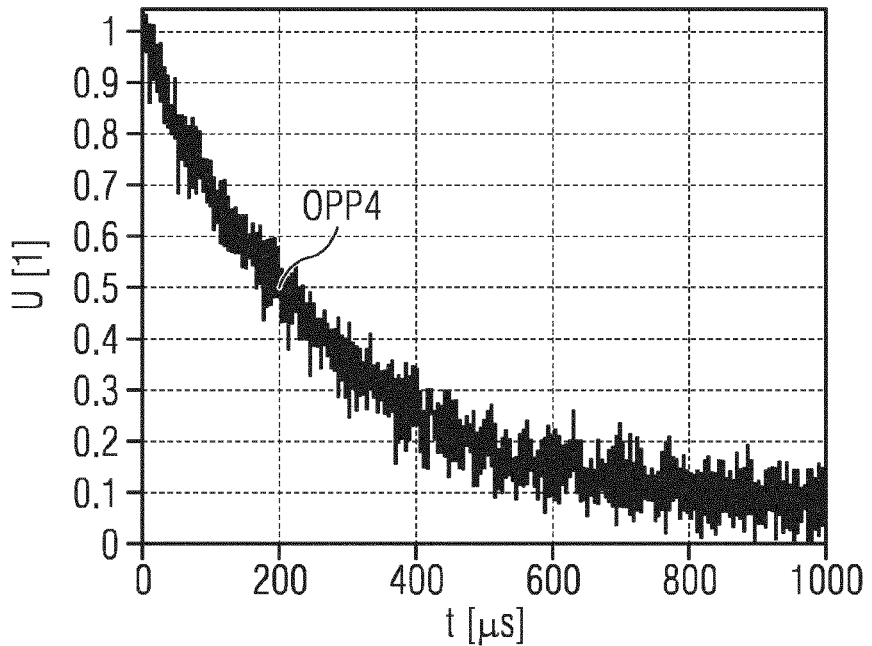
Figure 5G:
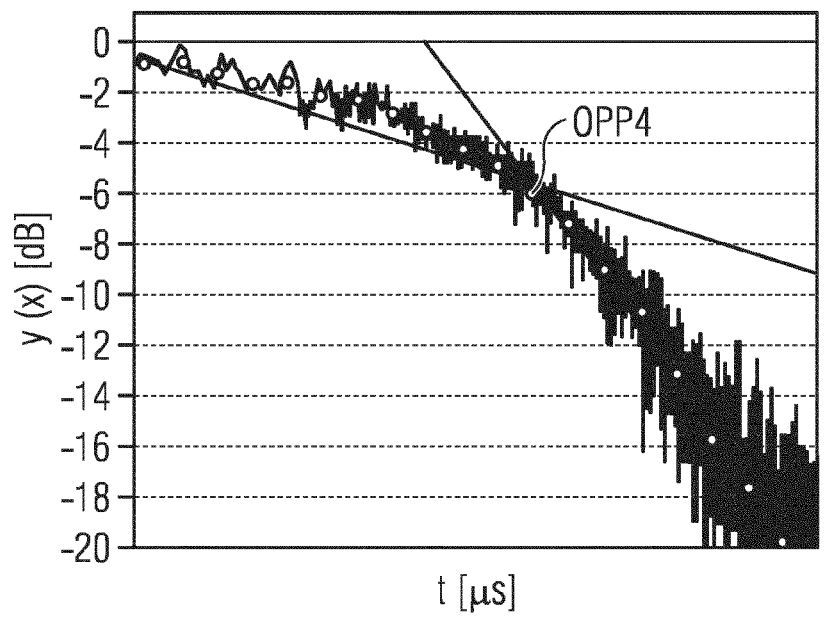
Figure 5H:
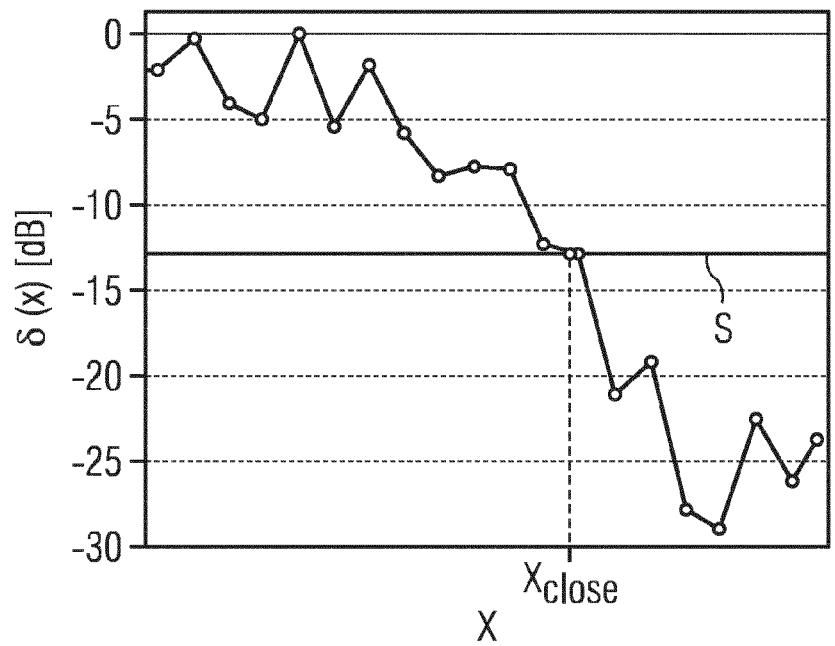

In order to reduce the influence of the noise when forming the derivative, a reduced number of value pairs have been determined from the value pairs (x(k); y(k)) of the transformed function in the oversampling method here. Said value pairs are illustrated as points and are used as a basis for the numerical derivation of the transformed function. The result of the numerical derivation—the derivative function $\delta(x)$—is illustrated in FIGS. 5D) and 5H). The transformed time point $X_{close}$ which corresponds to the closing time point can also be identified here by the threshold value S being undershot.

According to an alternative variant, the voltage values U(t) can already be sampled in an oversampling method. In this way, fewer voltage/time value pairs, which subsequently have to be transformed, are already obtained at the start.

Therefore, reliable detection of the closing time point is possible with the disclosed method, even in systems with an armature which swings out freely and has noisy signals.

What is claimed is:

1. A method for detecting a closing time point of a valve having a coil drive and a movable valve element that interacts with a valve seat to open and close the valve, wherein the coil drive comprises an electromagnetic stator with a field coil and a movable armature which is spaced apart from the stator in an inoperative position of the armature and which is configured to open the value by lifting the movable value element out of the valve seat, wherein the method comprises:
- impressing an electrical voltage into the field coil for a limited time to generate a field current through said field coil, as a result of which the movable armature is attracted, thereby causing an armature movement that lifts the valve element out of the valve seat;
- allowing the field current to decay to zero;
- then sampling and reading out a voltage profile (U(t)) across the field coil with respect to time in the form of value pairs (t(k); U(k)), each value pair comprising a time value (t(k)) and a voltage value (U(k) );
- transforming the voltage values and time values by forming a logarithm $x(k):=\log_b t(k)$ and $y(k):=c \cdot \log_b(U(k))$ with a base b and with a constant c to form a transformed function y(x) comprising value pairs (x(k); y(k));
- then numerically deriving the transformed function to form a derivative function $$\delta(x) := \frac{\Delta y(x)}{\Delta x};$$

- detecting a transformed time value $x_{close}$, which corresponds to a closing time point $t_{close}$ of the valve, based on the derivative function of a predetermined threshold value S (x) being undershot $\delta(x_{close}) \leq S(x)$; and
- calculating the closing time point $t_{close}$ by back-transformation $t_{close} = b^{x_{close}}$.

2. The method of claim 1, comprising determining each value pairs (t(k); U(k)) using an oversampling method.

3. The method of claim 1, comprising determining the value pairs (x(k); y(k)) of the transformed function y(x) using an oversampling method.

4. The method of claim 1 wherein the movable armature is configured to swing out freely when it falls back into its inoperative position.

5. The method of claim 1 wherein the movable armature is fixedly coupled to the valve element and configured to strike firmly when it falls back into its inoperative position, while the valve element falls into its valve seat.

6. The method of claim 1 wherein at least one of the movable armature and the stator has short-circuiting rings to assist in the formation of eddy currents.

7. A valve comprising:
- a movable valve element that interacts with a valve seat to open and close the valve, and
- a coil drive comprising:
  - an electromagnetic stator with a field coil
  - a movable armature which is (a) spaced apart from the stator in an inoperative position of the armature, and (b) configured to open the value by lifting the movable valve element out of the valve seat
- a control unit configured to impress an electrical voltage into the field coil for a limited time to generate a field current through said field coil, wherein the field coil attracts the movable armature, thereby causing an armature movement that lifts the value element out of the valve seat,
- means for, after the field current has decayed to zero, sampling and reading out the voltage profile (U(t)) across the field coil with respect to time in the form of value pairs (t(k); U(k)), each value pair comprising a time value (t(k)) and a voltage value (U(k))
- an evaluation unit configured to:
  - transforming the voltage values and time values by forming a logarithm $x(k):=\log_b t(k)$ and $y(k):=c \cdot \log_b U(k)$ with a base b and with a constant c to form a transformed function y(x) comprising value pairs (x(k); y(k)),
  - then numerically derive the transformed function to form a derivative function $$\delta(x) := \frac{\Delta y(x)}{\Delta x};$$

- detect a transformed time value $x_{close}$, which corresponds to a closing time point $t_{close}$ of the valve, based on the derivative function of a predetermined threshold value S(x) being undershot $\delta(x_{close}) \leq S(x)$; and
  - calculate the closing time point $t_{close}$ by back-transformation $t_{close} = b^{x_{close}}$.

8. The valve of claim 7, wherein the movable armature is configured to swing out when it falls back into its inoperative position.

9. The valve of claim 7, wherein the movable armature is fixedly coupled to the valve element and configured to firmly strike when it falls back into its inoperative position, while the valve element falls into its valve seat.

10. The valve of claim 7, wherein at least one of the movable armature and the stator has short-circuiting rings to assist in the formation of eddy currents.

11. The valve of claim 7, wherein the valve is an injection valve for an internal combustion engine.

12. The valve of claim 7, wherein each value pair (t(k); U(k)) is determined using an oversampling method.

13. The valve of claim 7, wherein the value pairs (x(k); y(k)) of the transformed function y(x) are determined using an oversampling method.

* * * * *